United States Patent
Vasisht (10) Patent No.: US 6,881,482 B2
(45) Date of Patent: Apr. 19, 2005

(54) MICROENCAPSULATION USING ELECTROMAGNETIC ENERGY AND CORE AND SHELL MATERIALS WITH DIFFERENT DIELECTRIC CONSTANTS AND DISSIPATION FACTORS

(75) Inventor: Niraj Vasisht, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 402 days.

(21) Appl. No.: 10/222,525

(22) Filed: Aug. 16, 2002

(65) Prior Publication Data

US 2003/0062641 A1 Apr. 3, 2003

Related U.S. Application Data

(60) Provisional application No. 60/312,704, filed on Aug. 16, 2001.

(51) Int. Cl.[7] .............................. B32B 9/04; B01J 13/02
(52) U.S. Cl. .............................. 428/402.24; 428/402.2; 428/402.21; 264/4.1; 264/4.3; 264/4.33; 264/4.4
(58) Field of Search ........................ 428/402.2, 402.21, 428/402.24; 264/4.1, 4.3, 4.33, 4.4

(56) References Cited

U.S. PATENT DOCUMENTS

| | | |
|---|---|---|
| 2,560,630 A | 7/1951 | Turner |
| 2,581,038 A | 1/1952 | Middendorf |
| 2,648,609 A | 8/1953 | Wurster |
| 2,799,241 A | 7/1957 | Wurster |
| 2,970,911 A | 2/1961 | Lorz |
| 3,015,128 A | 1/1962 | Somerville, Jr. |
| 3,110,626 A | 11/1963 | Larson |
| 3,159,874 A | 12/1964 | Langer et al. |
| 3,163,579 A | 12/1964 | Derivan |
| 3,279,994 A | 10/1966 | Koff |
| 3,341,466 A | 9/1967 | Brynko et al. |
| 3,356,569 A | 12/1967 | Nicodemus et al. |
| 3,389,194 A | 6/1968 | Sommerville |
| 3,436,223 A | 4/1969 | Wehrmeister |
| 3,471,304 A | 10/1969 | Hamdy et al. |
| 3,475,177 A | 10/1969 | Jones |
| 3,819,838 A | 6/1974 | Smith et al. |
| 3,951,904 A | 4/1976 | Tomonaga |
| 3,959,493 A | 5/1976 | Baalsrud et al. |
| 4,086,365 A | 4/1978 | Snetsinger et al. |
| 4,196,187 A | 4/1980 | Dannelly et al. |
| 4,409,392 A | 10/1983 | Hodge |
| 4,431,164 A | 2/1984 | Jungo et al. |
| 4,497,845 A | 2/1985 | Percel et al. |
| 4,511,584 A | 4/1985 | Percel et al. |
| 4,537,784 A | 8/1985 | Percel et al. |
| 4,542,031 A | 9/1985 | Nakajima et al. |
| 4,595,584 A | 6/1986 | Wu et al. |

(Continued)

FOREIGN PATENT DOCUMENTS

| | | |
|---|---|---|
| GB | 760193 | 10/1956 |
| GB | 936386 | 9/1963 |
| GB | 972128 | 10/1964 |
| GB | 2 150 023 A | 6/1985 |
| WO | WO 92/21249 | 12/1992 |

Primary Examiner—Samuel A. Acquah
(74) Attorney, Agent, or Firm—Paula D. Morris & Associates, P.C.

(57) ABSTRACT

Methods of making microcapsules and microcapsules comprising a core material and a shell material with substantially different dielectric constants and dissipation factors. Exposure to appropriate electromagnetic energy selectively (a) heats the core material with the higher dielectric constant and dissipation factor, directly or indirectly fusing the shell material and forming microcapsules, or (b) hardens polymerized shell material, which has a high dielectric constant and dissipation factor.

160 Claims, 3 Drawing Sheets

U.S. PATENT DOCUMENTS

| | | |
|---|---|---|
| 4,687,676 A | 8/1987 | Wu et al. |
| 4,713,245 A | 12/1987 | Ando et al. |
| 4,717,567 A | 1/1988 | Wu et al. |
| 4,772,477 A | 9/1988 | Weiss et al. |
| 4,775,540 A | 10/1988 | Hertel et al. |
| 4,797,288 A | 1/1989 | Sharma et al. |
| 4,837,004 A | 6/1989 | Wu et al. |
| 4,842,863 A | 6/1989 | Nishimura et al. |
| 4,960,600 A | 10/1990 | Kester et al. |
| H1002 H | 12/1991 | Hahn |
| 5,089,278 A * | 2/1992 | Haynes et al. ............... 426/98 |
| RE35,162 E | 2/1996 | Draguesku et al. |
| 5,496,571 A | 3/1996 | Blagdon et al. |
| 5,518,730 A | 5/1996 | Fuisz |
| 5,892,476 A | 4/1999 | Gindrup et al. |
| 5,984,468 A | 11/1999 | Malhotra |
| 6,099,864 A * | 8/2000 | Morrison et al. ........... 424/489 |
| 2002/0142241 A1 * | 10/2002 | Palmer ................... 430/110.2 |
| 2003/0013783 A1 * | 1/2003 | Kommareddi et al. ...... 523/175 |

\* cited by examiner

MICROENCAPSULATION USING ELECTROMAGNETIC ENERGY AND CORE AND SHELL MATERIALS WITH DIFFERENT DIELECTRIC CONSTANTS AND DISSIPATION FACTORS

The present application claims the benefit of U.S. Provisional Application Ser. No. 60/312,704, filed Aug. 16, 2001, pending.

FIELD OF THE INVENTION

The invention relates to methods of making microcapsules and microcapsules comprising a core material and a shell material with substantially different dielectric constants and dissipation factors. Exposure to appropriate electromagnetic energy selectively (a) heats the core material with the higher dielectric constant and dissipation factor, directly or indirectly fusing the shell material and forming microcapsules, or (b) hardens polymerized shell material, which has a high dielectric constant and dissipation factor.

BACKGROUND

Most current microencapsulation methods are used to produce a uniform coating on an irregular shaped particle. Such methods typically require relatively complex equipment and/or a substantial input of labor. Such methods typically are very expensive. Simpler, less expensive microencapsulation methods are needed for encapsulating core materials having relatively non-uniform shapes.

SUMMARY OF THE INVENTION

In one aspect, the invention provides a method of microencapsulation comprising:
  providing core material effective to absorb electromagnetic energy at a given wavelength and frequency;
  providing shell material ineffective to absorb electromagnetic energy at said given wavelength and frequency;
  forming a precursor mixture comprising said core material and said shell material; and
  exposing said precursor mixture to said electromagnetic energy at a power and for a time effective to microencapsulate said core material with said shell material.

In another aspect, the invention provides a method of microencapsulation comprising:
  providing a core material having a first dielectric constant and a first dissipation factor;
  providing a shell material having a second dielectric constant that is substantially different than said first dielectric constant and having a second dissipation factor that is substantially different than said first dissipation factor;
  forming a precursor mixture comprising said core material and said shell material;
  exposing said precursor mixture to electromagnetic energy under conditions effective to microencapsulate said core material with said shell material.

In a preferred embodiment, the second dielectric constant is a magnitude or more different than the first dielectric constant, and the second dissipation factor is a magnitude or more different than the first dissipation factor.

In one embodiment, the second dielectric constant is substantially less than the first dielectric constant and the second dissipation factor is substantially less than the first dissipation factor. Preferably, "substantially less than" is a magnitude or more less than. In this embodiment, said "exposing" heats the core material and causes fusing of the shell material immediately adjacent to the heated core material. The core material preferably comprises particles having an average diameter x. The shell materials preferably have an average diameter of about 0.1x, more preferably 0.01x.

In another embodiment, the second dielectric constant is substantially greater than the first dielectric constant and the second dissipation factor is substantially greater than the first dissipation factor. Preferably, "substantially greater than" is a magnitude or more greater than. In this embodiment, exposing the precursor mixture to electromagnetic energy preferably induces polymerization of the shell material.

In another aspect, the invention provides microcapsules comprising a core material effective to absorb electromagnetic energy at a given wavelength and frequency and a shell material that is ineffective to absorb said electromagnetic energy.

In another aspect, the invention provides microcapsules comprising a core material having a first dielectric constant and a first dissipation factor encapsulated by a shell material having a second dielectric constant and a second dissipation factor. The first dielectric constant and the first dissipation factor are substantially different than, preferably at least a magnitude different than, the second dielectric constant and the second dissipation factor, respectively.

In another aspect, the invention provides microcapsules comprising a core material having a first dielectric constant and a first dissipation factor encapsulated by a shell material. The shell material has a second dielectric constant and a second dissipation factor less than said first dielectric constant and said first dissipation factor, respectively.

In yet another aspect, the invention provides microcapsules comprising a core material having a first dielectric constant and a first dissipation factor encapsulated by a shell material having a second dielectric constant and a second dissipation factor. The second dielectric constant and the second dissipation factor are greater than the first dielectric constant and the first dissipation factor, respectively.

DETAILED DESCRIPTION OF THE FIGURES

DETAILED DESCRIPTION OF THE INVENTION

The present invention provides simple, efficient, and relatively inexpensive methods for forming microcapsules. The methods of the present invention use electromagnetic energy to form microcapsules from a core material having a "first" dielectric constant and a "first" dissipation factor, and a shell material having a "second" dielectric constant and a "second" dissipation factor. The first dielectric constant is "substantially different" than the second dielectric constant and the first dissipation factor is "substantially different" than the second dissipation factor. As used herein, the term "substantially different" is defined as a difference sufficiently great to permit microcapsules to form under the conditions of operation. Preferably, the difference between the first and second dielectric constant and the first and second dissipation factor is about one magnitude or more.

Microwaves interact with materials through electric and magnetic fields generated in the wave guide. Materials, which absorb energy from an electromagnetic (EM) field, can be heated by exposure to such a field. The absorption of electromagnetic energy also may drive a reaction, such as a polymerization reaction. The selective microwave absorption depends on the power density of the EM field and on the absorptive characteristics of the materials, as defined by the complex dielectric constant or dissipation factor (loss tangent). Absorption of microwave energy is high when the dissipation factor or loss tangent is high. The loss tangent (tan δ) is defined as:

$$\tan \delta = \frac{\epsilon''}{\epsilon'}$$

wherein $\epsilon^* = j\epsilon'' + \epsilon'$ is the complex dielectric constant.

Microwave heating creates non-uniform thermal or energy absorption gradients which, in general, are a disadvantage. In the present process, the formation of non-uniform thermal or energy absorption gradients helps in inducing a selective absorption of energy either by the core material immediately adjacent to the shell material, or by the shell material itself. The result is microcapsules of the core material bearing a coating of the fused or polymerized shell material.

With appropriate process control on the amount of microwave energy supplied, appropriate wave guide design, and suitable selection of core and shell ingredients, the invention offers unique methods to coat materials of non-uniform shapes. The methods require only localized heating and therefore require a lower net temperature increase in the substrate. The methods have improved reaction specificity. The electromagnetic energy can be delivered rapidly at a specific time and place. The method provides increased processing speed, high coating efficiency, and the ability to prepare microcapsules with different payloads. Although batch, the methods are inexpensive because of short processing time and the ability to handle high production volumes.

Higher Dielectric Characteristics Core Material

In a preferred embodiment, the second dielectric constant and the second dissipation factor (of the shell material) are substantially less than, preferably a magnitude or more less than the first dielectric constant and the first dissipation factor (of the core material). In this embodiment, the core material either inherently has a relatively high "first" dielectric constant and a relatively high "first" dissipation factor, or contains one or more absorption enhancer(s) to increase the absorption of electromagnetic energy by the core material. The core material, alone, or in combination with one or more absorption enhancer(s) and/or one or more surface wetting agent(s), is mixed with a shell material that has a relatively low dielectric constant. The mixture is exposed to electromagnetic energy at a wavelength and frequency that are ineffective to heat the shell material, but that are effective to heat the core material and to induce melting of the shell material immediately adjacent to and surrounding the core material. Upon cooling, the previously melted shell material forms a fused, intact shell around the core material. The remaining shell material may be simply sieved or washed away, for example by density separation, leaving the resulting microcapsules.

Because water absorbs microwave energy effectively at 2.456 Hz, suitable core materials with a relatively high dielectric constant and a relatively high dissipation factor include, but are not necessarily limited to materials that comprise water, including, but not necessarily limited to salts, hydrates, oxides, water soluble materials, water absorbing materials, and hydrophilic materials. The purity of the compound and the amount of water present may influence the loss factor and microwave frequency of absorption, thus playing an important role during the microencapsulation process.

Specific examples of suitable core materials with a relatively high dielectric constant include, but are not necessarily limited to alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

It is not always necessary to mix a core material with a relatively high dielectric constant and a relatively high dissipation factor with an absorption enhancer. However, depending upon the core material and the shell material, it may be desirable to use one or more absorption enhancer(s) to increase absorption of electromagnetic energy by the core material. A variety of absorption enhancers may be used, including but not necessarily limited to chlorides, carbonates, nitrates, phosphates, carbon black, silicates, sodium silicates, calcium silicates, CABOSIL, silica aerogels, silica, silicon dioxides, talc, starches, maltodextrins, mica, bentonite, and other clay particles. Preferred absorption enhancers include, but are not necessarily limited to carbon black, talc, and silicates. The excess of core material to absorption enhancer is at least about 2:1, preferably 10:1, more preferably about 20:1.

One or more absorption enhancer(s) may be used to increase the absorption of electromagnetic energy throughout a given core material. Or, the absorption enhancer(s) may be used to increase absorption of electromagnetic energy immediately adjacent to the shell material. In order to accomplish this, spheronization preferably is conducted. "Spheronization" is a method by which micronized particles of absorption enhancer physically adhere onto the core particle by powder blending, semi-wet, or wet blending methods, including but not necessarily limited to ball-mill mixing, impaction, or compressive compaction. If an absorption enhancer is used, the absorption enhancer may be mixed with a surface wetting agent to provide improved surface adhesion to the core particle and/or to increase the efficiency of the spheronization process. Suitable wetting agents include, but are not necessarily limited to anionic, cationic, or non-ionic surfactants. Examples of suitable wetting agents include, but are not necessarily limited to sodium dodecyl sulphate, PLURONICS™, TWEENS™, SPANS™, phospholipids, and the like. Where an absorption enhancer is used, the core material is mixed with the absorption enhancer. After adequate mixing, by kneading, hand mixing, dough mixing, powder blending, or ball-mixing techniques, the mixture of absorption enhancer and core material is sieved to remove excess absorption enhancer, preferably carbon black.

The core material is mixed with an excess of suitable shell material, preferably a micronized shell material. Where the core material has been spheronized, the sieved mixture is added to an excess of the shell material. The ratio of sieved mixture to shell material is about 1:5, preferably about 1:10, more preferably about 1:100 or greater. The particles of core material should be well dispersed in the shell material.

Suitable shell materials preferably exhibit a "sharp" phase transition, i.e., melt point, gel point, softening point crystallization point, glass transition temperature, and the like. In this context, the term "sharp" means that the shell system exhibits a change in specific heat and exhibits a latent heat ($\Delta\lambda$) or change in enthalpy of polymerization ($\Delta H_p$). The shell particles preferably are much smaller than the core particles, preferably only 0.1x, more preferably only 0.01x, where x is the average diameter of the core particles. Preferred shell particles are micronized, and have an average diameter of from about 1 $\mu$m to about 500 $\mu$m. Micronized materials are available from source companies or can be produced by conventional spray congealing methods.

Suitable shell materials with a relatively low dielectric constant and a relatively low dissipation factor include, but are not necessarily limited to waxes, fats, resins, and low melting polymers. Examples of suitable waxes include, but are not necessarily limited to paraffins, polyalkylenes, polyakylene glycols, polyalkylene oxides, edible waxes, mineral wax, shellac, and other natural waxes. Examples of suitable fats include, but are not necessarily limited to monoglycerides, diglycerides, triglycerides, lipids, fatty acids, and fatty alcohols. Examples of low melting polymers include, but are not necessarily limited to polyethylene oxide, polyethylene glycol, polyethylene, polypropylene, and polytetrafluoroethylene. Preferably, the shell materials are micronized, exhibit a sharp melt point, and do not absorb the electromagnetic energy used to heat the core material.

After mixing the core material with an excess of shell material, the mixture is then exposed to electromagnetic energy to "cure" the mixture and to microencapsulate the core material. The electromagnetic field produces heat by means of the dielectric loss properties of the core material. The use of an electromagnetic field having substantially any frequency or substantially any wavelength should operate according to the present invention; however, certain frequencies or wavelengths will be preferred in certain circumstances, as outlined herein.

Where the core material has the relatively higher dielectric constant and the relatively higher dissipation factor, a preferred frequency range heats a selected core material but the intensity of heating is localized. In other words, the absorption intensity is sufficiently high to cause the micronized shell material immediately adjacent to the core material to fuse, leaving the remainder of the micronized shell material in micronized form.

The preferred frequency of operation depends on the absorption efficiency of the core so that the first dielectric constant and the first dissipation factor are maximized at that specific frequency range. The frequency dependence on heating is also influenced by the size of the core particle. When the size of the core particle is small, shorter wavelengths of microwave energy may be required for effective localized heating by Marangoni's dissipation of the core particle that has a high dielectric constant and dissipation factor. Preferably, the wavelength of the electromagnetic wave should be less than the largest dimension of the core particle, most preferably less than 0.1x of the size of the core. In such a case, energy absorption occurs by Marangoni's heat dissipation.

The electromagnetic field may be used to quickly raise the temperature of the core material to a desired point, and then to maintain the core material at that temperature for the desired "cure" period.

Preferred electromagnetic energy sources for use in this embodiment have a frequency region selected from the group consisting of a millimeter wave region and a microwave region. A millimeter wave energy source has a frequency in the range of from about 30 GHz to about 300 GHz, more preferably in the range of from about 30 GHz to about 50 GHz. A microwave energy source has a frequency in the range of from about 0.5 GHz to about 30 GHz, more preferably in the range of from about 1 GHz to about 10 GHz. The energy source preferably has a power in the range of from about 250 W to about 5 kW, most preferably in the range of from about 500 kW to about 1500 kW.

The "fusion time" for a given mixture is defined as the period of time required to induce fusion of the micronized shell material immediately adjacent to the core material in the mixture and to produce a continuous shell of fused material around the core material. The "fusion time" will depend on the type of core material, the electromagnetic energy source and its power, the shell material, absorption efficiency of the particle and wave guide design, and other reaction conditions. Suitable "fusion time" periods are in the range of from about 2 seconds to about 500 seconds, preferably in the range of from about 10 seconds to about 100 seconds, and most preferably in the range of from about 20 seconds to about 60 seconds.

Lower Dielectric Characteristic Core Material

Alternately, a core material that has a relatively low dielectric constant and a relatively low dissipation factor is mixed with a shell or monomer material that polymerizes to form a shell which has a relatively high dielectric constant and a relatively high dissipation factor. In this case, the mixture is exposed to electromagnetic energy at a wavelength and frequency that harden polymerized shell material adsorbed to the surface of emulsified droplets of core material. The polymerized shell material forms a fused, intact shell around the core material. The remaining shell material may be simply washed away, leaving the resulting microcapsules.

According to a preferred embodiment, a "precursor mixture" to be exposed to electromagnetic energy is prepared by producing an emulsion or suspension of the core material in an immiscible solvent. The emulsion or suspension may be in a hydrophilic solvent or a hydrophobic solvent. The type of solvent used will depend upon the miscibility of the core material. Preferred solvents are hydrophilic and include, but are not necessarily limited to water, aqueous solutions, N-methyl pyrrolidone, acetone, methyl ethyl ketone, methyl isobutyl ketone, heptanol, and octanol. The use of an aqueous solution of increases the efficiency of absorption of microwave energy. In a preferred embodiment, the solvent is aqueous, and one or more shell monomers/precursor(s) which are miscible with the aqueous solvent are added to the emulsion/suspension to form a "precursor mixture." Examples of suitable water-miscible monomeric shell materials include, but are not necessarily limited to styrene oxide, acrylic acid, methacrylic acid, glycols, and acrylate monomers. Most preferred shell materials are acrylic acid, methyacrylic acid, and acrylate monomers. The "precursor mixture" may contain a polymerization catalyst. In a preferred embodiment, the polymerization catalyst is a weak acid or base which alters the pH of the solution, thereby accelerating the polymerization reaction. Without limiting the invention to a particular theory of operation, it is believed that, as it polymerizes, the polymerizing shell material becomes increasingly less susceptible to microwave absorption. As polymerization occurs, phase separation is induced by the like interactions, which allows deposition of the formed polymer onto the surface of the core droplets. Exposure of the mixture to electromagnetic energy accelerates polymerization and hardens the adsorbed polymeric shell material, completing the formation of the microcapsules. A cross-linking agent may be added before application of microwave energy.

Preferred electromagnetic energy sources for use in this embodiment are the same as previously described. The following microwave heating rates are expected for the following monomers at the following concentrations:

| Monomer | Concentration (vol. %) | Microwave heating Rate (J/s) |
|---|---|---|
| Acrylic Acid | 25 | 14 |
| | 40 | 30.6 |
| | 50 | 32.6 |
| | 60 | 27.3 |
| | 75 | 14.7 |
| | 100 | 2.0 |
| | 50 in conc. HCl | 17.8 |
| | 50 in 50% HCl | 13.6 |
| | 75 in conc. HCl | 32.6 |
| 2-Hydroxyethyl Methacrylate | 25 | 19.7 |
| | 50 | 32.1 |
| | 75 | 23.7 |
| | 100 | 17.6 |
| Methacrylic Acid | 25 | 12.6 |
| | 50 | 24.0 |
| | 75 | 10.1 |
| | 100 | 0.9 |
| Deionized water | 100 | 5.8 |

The "hardening time" for a given shell material is defined as the period of time that a polymerization mixture must be exposed to electromagnetic energy in order to produce a hardened, continuous shell of hard polymer around the core material. The "hardening time" will depend on the type of core material, the electromagnetic energy source and its power, the shell material, absorption efficiency of the particle and wave guide design, and other reaction conditions. Suitable "hardening times" are from about 10 seconds to about 500 seconds, preferably in the range of from about 20 seconds to about 100 seconds, and most preferably in the range of from about 30 seconds to about 60 seconds.

The invention will be better understood with reference to the following examples, which are illustrative only, and should not be construed as limiting the present invention to any particular embodiment.

EXAMPLE 1

An organic catalyst, quaternary phosphonium salts (TPP, Sigma), was selected as a core. The TPP initially was mixed with carbon black. Spheronization with carbon black was conducted by ball-milling to provide uniform surface adhesion to the catalyst surface. In a simplified experiment, TPP was well mixed with carbon black in a ratio of 3:1 using a spatula. After adequate mixing, the mixture was sieved to remove the excess carbon black. The sieved TPP/carbon black mixture was later added to microcrystalline mineral wax (Petrolite™ C-1035) in the ratio of 1:5 such that the particles were well dispersed in the micronized wax. The resultant mixture was exposed to microwave energy in a conventional microwave oven (600 W) at full power for 2 minutes. The resulting microcapsules were observed under microscope to exhibit coated sharp edges of uniform thickness of from about 10 µm to about 20 µm.

EXAMPLE 2

10 g of citric acid crystals obtained from Sigma, having an approximate particle size ranging from about 250 µm to about 1000 µm, are added to polyethylene wax (POLYWAX™ 500) at a ratio of 1:4. The particles of acidulant are well dispersed in the micronized wax. The resultant mixture is exposed to microwave energy in a conventional microwave oven (750 W) at full power for about 3.5 minutes. The resulting microcapsules are observed under the microscope to exhibit coated sharp edges of fused wax, and complete encapsulation.

EXAMPLE 3

Type A-5 alumina (Sigma) is dispersed in 10 mL of SPAN 80 to improve surface wetting characteristics. Excess SPAN 80 is filtered in a Buckner's funnel to form a cake. The resultant cake is blended with ULTRAFLEX WHITE (Petrolite) microcrystalline wax at a ratio of 1:20 to obtain a dry, free-flowing powder. The resultant mixture is subjected to a conventional 750 W microwave oven for period of about 1 minute. Microspheres are separated upon subsequent washing in water. The encapsulated alumina settles at the bottom, while excess wax floats to the top. The resultant capsules are observed under a microscope to exhibit several alumina particles in one microsphere. All microspheres are well coated; however, the particles are not spherical.

EXAMPLE 4

Figure 1:
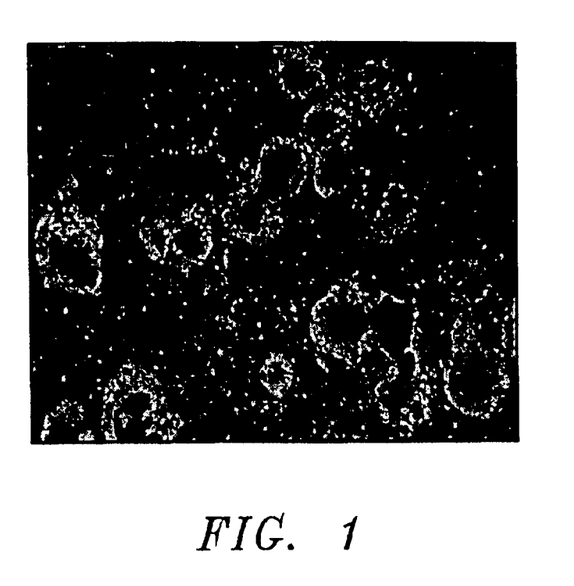
FIG. 1 is an optical micrograph of the microcapsules formed in Example 1 after two minutes of microwave exposure in a 600 W microwave oven.
Figure 2:
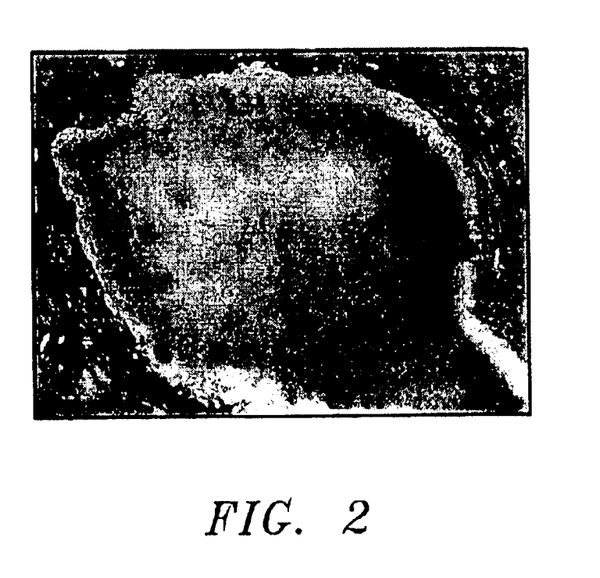
FIG. 2 is an optical micrograph of the sharp edges of the microcapsules of FIG. 1 showing efficient coating of the sharp edges of the TPP/carbon black particle.
Figure 3:
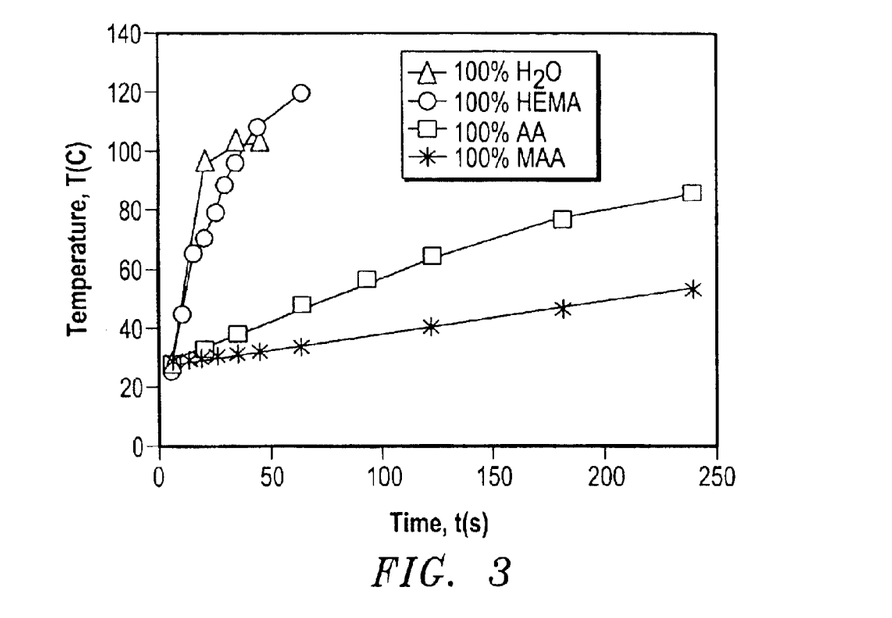
FIG. 3 is a graph of the temperature versus time during electromagnetic heating at 2.45 GHz of pure $H_2O$, pure hydroxyethylmethacrylate, pure acrylic acid, and pure methacrylic acid, respectively.
Figure 4:
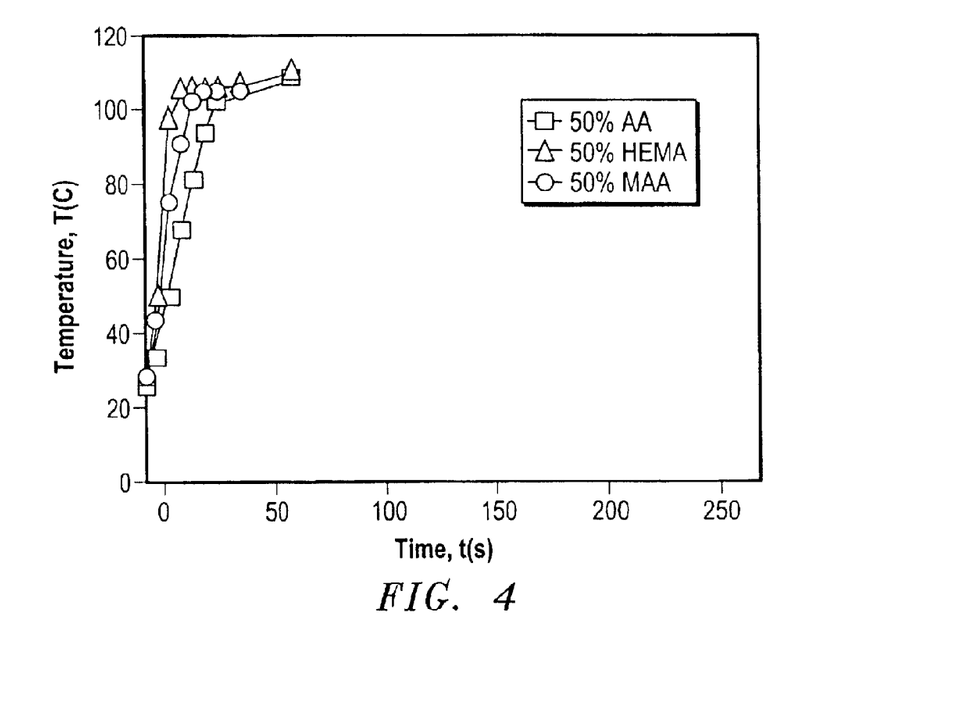
FIG. 4 is a graph of temperature versus time during electromagnetic heating at 2.45 GHz of aqueous solutions of acrylic acid, hydroxyethylmethacrylate, and methacrylic acid, respectively.
Figure 5:
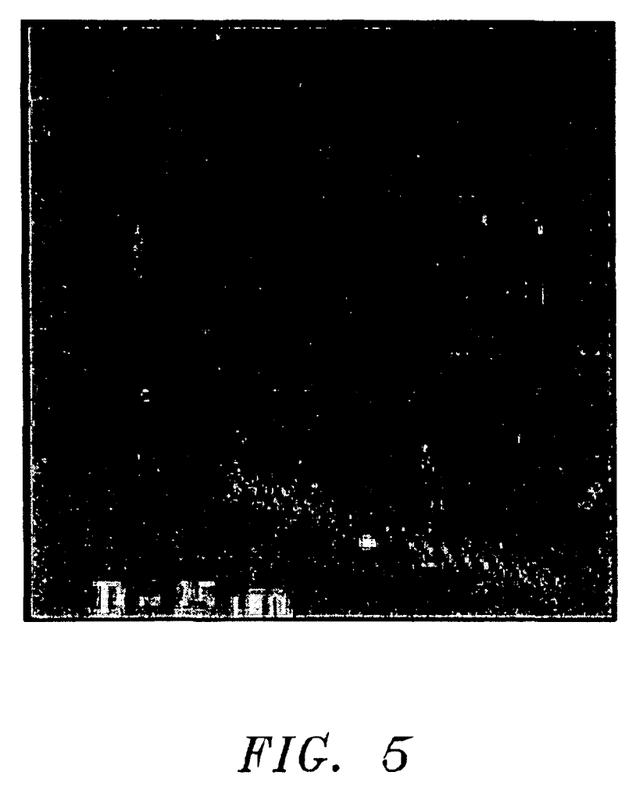
FIG. 5 is an optical micrograph of the microcapsules formed in Example 4.

A 100 g. mixture of 5% wt hydroxymethacrylate (Fischer Scientific) in water was prepared. Methyl ethyl ketone (MEK) Peroxide at 1% concentration and 0.5% ethyl glycol dimethacrylate (EGDMA) was added as an initiator and cross-linking agent, respectively. The resultant solution was then redispersed in silicon fluid (200 cP) and subjected to 750 W microwave heating for 5 minutes. Microbeads were prepared in size ranging from about 10 µm to 50 µm. The results are shown in FIGS. 3 and 4.

Persons of ordinary skill in the art will recognize that many modifications may be made to the present invention without departing from the spirit and scope of the present invention. The embodiment described herein is meant to be illustrative only and should not be taken as limiting the invention, which is defined in the claims.

I claim:

1. A method of microencapsulation comprising:
   providing core material effective to absorb electromagnetic energy at a given wavelength and frequency;
   providing shell material ineffective to absorb electromagnetic energy at said given wavelength and frequency;
   forming a precursor mixture comprising said core material and said shell material; and
   exposing said precursor mixture to said electromagnetic energy at a power and for a time effective to microencapsulate said core material with said shell material.

2. The method of claim 1 wherein said exposing said precursor mixture to said electromagnetic energy produces heated core material and fuses said shell material adjacent to said heated core material.

3. The method of claim 1 wherein said core material is a particulate having a non-uniform shape.

4. A method of microencapsulation comprising:
providing a core material having a core material dielectric constant and a core material dissipation factor;
providing a shell material having a shell material dielectric constant that is substantially different than said core material dielectric constant and having a shell material dissipation factor that is substantially different than said core material dissipation factor;
forming a precursor mixture comprising said core material and said shell material;
exposing said precursor mixture to a source of electromagnetic energy under conditions effective to microencapsulate said core material with said shell material.

5. The method of claim 4 wherein said shell material dielectric constant is a magnitude or more different than said core material dielectric constant, and said shell material dissipation factor is a magnitude or more different than said core material dissipation factor.

6. The method of claim 4 wherein said shell material dielectric constant is substantially less than said core material dielectric constant and said shell material dissipation factor is substantially less than said core material dissipation factor.

7. The method of claim 5 wherein said shell material dielectric constant is substantially less than said core material dielectric constant and said shell material dissipation factor is substantially less than said core material dissipation factor.

8. The method of claim 4 wherein said exposing said precursor mixture to electromagnetic energy produces heated core material and fuses said shell material immediately adjacent to said heated core material.

9. The method of claim 5 wherein said exposing said precursor mixture to electromagnetic energy produces heated core material and fuses said shell material immediately adjacent to said heated core material.

10. The method of claim 6 wherein said exposing said precursor mixture to electromagnetic energy produces heated core material and fuses said shell material immediately adjacent to said heated core material.

11. The method of claim 7 wherein said exposing said precursor mixture to electromagnetic energy produces heated core material and fuses said shell material immediately adjacent to said heated core material.

12. The method of claim 4 wherein said core material comprises particles having an average diameter (x) and said shell material has an average diameter of about 0.1x.

13. The method of claim 12 wherein said shell material has an average diameter of about 0.01x.

14. The method of claim 11 wherein said core material comprises particles having an average diameter (x) and said shell material has an average diameter of about 0.1x.

15. The method of claim 14 wherein said shell material has an average diameter of about 0.01x.

16. The method of claim 4 further comprising spheronizing said core material.

17. The method of claim 5 further comprising spheronizing said core material.

18. The method of claim 6 further comprising spheronizing said core material.

19. The method of claim 7 further comprising spheronizing said core material.

20. The method of claim 8 further comprising spheronizing said core material.

21. The method of claim 9 further comprising spheronizing said core material.

22. The method of claim 10 further comprising spheronizing said core material.

23. The method of claim 11 further comprising spheronizing said core material.

24. The method of claim 4 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

25. The method of claim 5 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

26. The method of claim 6 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

27. The method of claim 11 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

28. The method of claim 16 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

29. The method of claim 21 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

30. The method of claim 4 further comprising micronizing said shell material.

31. The method of claim 5 further comprising micronizing said shell material.

32. The method of claim 6 further comprising micronizing said shell material.

33. The method of claim 11 further comprising micronizing said shell material.

34. The method of claim 16 further comprising micronizing said shell material.

35. The method of claim 21 further comprising micronizing said shell material.

36. The method of claim 24 further comprising micronizing said shell material.

37. The method of claim 29 further comprising micronizing said shell material.

38. The method of claim 37 wherein said forming a precursor mixture comprises adding a sieved mixture of said core material to an excess of said shell material.

39. The method of claim 38 wherein said excess comprises a ratio of sieved mixture to shell material of about 1:5 or greater.

40. The method of claim 38 wherein said ratio is about 1:10 or greater.

41. The method of claim 38 wherein said ratio is about 1:100 or greater.

42. The method of claim 4 wherein said shell material exhibits a sharp phase transition.

43. The method of claim 5 wherein said shell material exhibits a sharp phase transition.

44. The method of claim 6 wherein said shell material exhibits a sharp phase transition.

45. The method of claim 11 wherein said shell material exhibits a sharp phase transition.

46. The method of claim 16 wherein said shell material exhibits a sharp phase transition.

47. The method of claim 21 wherein said shell material exhibits a sharp phase transition.

48. The method of claim 4 wherein said shell material is selected from the group consisting of waxes, fats, monomers, and low melting polymers.

49. The method of claim 4 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

50. The method of claim 30 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

51. The method of claim 37 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

52. The method of claim 4 further comprising providing said precursor mixture with a quantity of at least one absorption enhancer under conditions effective to increase absorption of electromagnetic energy by said precursor mixture.

53. The method of claim 52 wherein said absorption enhancer is selected from the group consisting of chlorides, carbonates, nitrates, phosphates, carbon black, silicates, sodium silicates, calcium silicates, CABOSIL, silica aerogels, silica, silicon dioxides, talc, starches, maltodextrins, mica, bentonite, and other clay particles.

54. The method of claim 52 wherein said absorption enhancer is selected from the group consisting of carbon black, talc, and silicates.

55. The method of claim 54 wherein said quantity is at least about 2:1.

56. The method of claim 54 wherein said quantity is at least about 10:1.

57. The method of claim 5 further comprising providing said precursor mixture with a quantity of at least one absorption enhancer under conditions effective to increase absorption of electromagnetic energy by said precursor mixture.

58. The method of claim 57 wherein said absorption enhancer is selected from the group consisting of chlorides, carbonates, nitrates, phosphates, carbon black, silicates, sodium silicates, calcium silicates, CABOSIL, silica aerogels, silica, silicon dioxides, talc, starches, maltodextrins, mica, bentonite, and other clay particles.

59. The method of claim 57 wherein said absorption enhancer is selected from the group consisting of carbon black, talc, and silicates.

60. The method of claim 59 wherein said quantity is at least about 2:1.

61. The method of claim 59 wherein said quantity is at least about 10:1.

62. The method of claim 16 further comprising providing said precursor mixture with a quantity of at least one absorption enhancer under conditions effective to increase absorption of electromagnetic energy by said precursor mixture.

63. The method of claim 62 wherein said absorption enhancer is selected from the group consisting of chlorides, carbonates, nitrates, phosphates, carbon black, silicates, sodium silicates, calcium silicates, CABOSIL, silica aerogels, silica, silicon dioxides, talc, starches, maltodextrins, mica, bentonite, and other clay particles.

64. The method of claim 62 wherein said absorption enhancer is selected from the group consisting of carbon black, talc, and silicates.

65. The method of claim 64 wherein said quantity is at least about 2:1.

66. The method of claim 64 wherein said quantity is at least about 10:1.

67. The method of claim 21 further comprising providing said precursor mixture with a quantity of at least one absorption enhancer under conditions effective to increase absorption of electromagnetic energy by said precursor mixture.

68. The method of claim 67 wherein said absorption enhancer is selected from the group consisting of chlorides, carbonates, nitrates, phosphates, carbon black, silicates, sodium silicates, calcium silicates, CABOSIL, silica aerogels, silica, silicon dioxides, talc, starches, maltodextrins, mica, bentonite, and other clay particles.

69. The method of claim 67 wherein said absorption enhancer is selected from the group consisting of carbon black, talc, and silicates.

70. The method of claim 69 wherein said quantity is at least about 2:1.

71. The method of claim 69 wherein said quantity is at least about 10:1.

72. The method of claim 30 further comprising providing said precursor mixture with a quantity of at least one absorption enhancer under conditions effective to increase absorption of electromagnetic energy by said precursor mixture.

73. The method of claim 72 wherein said absorption enhancer is selected from the group consisting of chlorides, carbonates, nitrates, phosphates, carbon black, silicates, sodium silicates, calcium silicates, CABOSIL, silica aerogels, silica, silicon dioxides, talc, starches, maltodextrins, mica, bentonite, and other clay particles.

74. The method of claim 72 wherein said absorption enhancer is selected from the group consisting of carbon black, talc, and silicates.

75. The method of claim 74 wherein said quantity is at least about 2:1.

76. The method of claim 74 wherein said quantity is at least about 10:1.

77. The method of claim 34 further comprising providing said precursor mixture with a quantity of at least one absorption enhancer under conditions effective to increase absorption of electromagnetic energy by said precursor mixture.

78. The method of claim 77 wherein said absorption enhancer is selected from the group consisting of chlorides, carbonates, nitrates, phosphates, carbon black, silicates, sodium silicates, calcium silicates, CABOSIL, silica aerogels, silica, silicon dioxides, talc, starches, maltodextrins, mica, bentonite, and other clay particles.

79. The method of claim 77 wherein said absorption enhancer is selected from the group consisting of carbon black, talc, and silicates.

80. The method of claim 79 wherein said quantity is at least about 2:1.

81. The method of claim 79 wherein said quantity is at least about 10:1.

82. The method of claim 35 further comprising providing said precursor mixture with a quantity of at least one absorption enhancer under conditions effective to increase absorption of electromagnetic energy by said precursor mixture.

83. The method of claim 82 wherein said absorption enhancer is selected from the group consisting of chlorides, carbonates, nitrates, phosphates, carbon black, silicates, sodium silicates, calcium silicates, CABOSIL, silica aerogels, silica, silicon dioxides, talc, starches, maltodextrins, mica, bentonite, and other clay particles.

84. The method of claim 82 wherein said absorption enhancer is selected from the group consisting of carbon black, talc, and silicates.

85. The method of claim 84 wherein said quantity is at least about 2:1.

86. The method of claim 84 wherein said quantity is at least about 10:1.

87. The method of claim 30 wherein said electromagnetic energy has a frequency range sufficiently high to fuse micronized shell material immediately adjacent to said core material, leaving a remainder of said micronized shell material in micronized form.

88. The method of claim 37 wherein said electromagnetic energy has a frequency range sufficiently high to fuse micronized shell material immediately adjacent to said core material, leaving a remainder of said micronized shell material in micronized form.

89. The method of claim 4 wherein said core material comprises core particles, and said electromagnetic energy has a wavelength less than a largest dimension of said core particles.

90. The method of claim 89 wherein said wavelength is about 0.1x or less of said largest dimension.

91. The method of claim 16 wherein said core material comprises spheronized particles, and said electromagnetic energy has a wavelength less than a largest dimension of said spheronized particles.

92. The method of claim 91 wherein said wavelength is about 0.1x or less of said largest dimension.

93. The method of claim 21 wherein said core material comprises spheronized particles, and said electromagnetic energy has a wavelength less than a largest dimension of said spheronized particles.

94. The method of claim 93 wherein said wavelength is about 0.1x or less of said largest dimension.

95. The method of claim 87 wherein said source of electromagnetic energy has a frequency region selected from the group consisting of:
a millimeter wave energy source, having a frequency of from about 30 GHz to about 300 GHz; and
a microwave energy source, having a frequency of from about 0.5 GHz to about 30 GHz.

96. The method of claim 95 wherein
said millimeter wave energy source has a frequency of from about 30 GHz to about 50 GHz; and
said microwave energy source has a frequency of from about 1 GHz to about 10 GHz.

97. The method of claim 95 wherein said source of electromagnetic energy has a power of from about 250 W to about 5 kW.

98. The method of claim 95 wherein said source of electromagnetic energy has a power of from about 500 kW to about 1500 kW.

99. The method of claim 8 wherein said conditions comprise a fusion time of from about 2 seconds to about 500 seconds.

100. The method of claim 8 wherein said conditions comprise a fusion time of from about 10 seconds to about 100 seconds.

101. The method of claim 9 wherein said conditions comprise a fusion time of from about 2 seconds to about 500 seconds.

102. The method of claim 9 wherein said conditions comprise a fusion time of from about 10 seconds to about 100 seconds.

103. A method of microencapsulation comprising:
providing an emulsion or suspension of a core material in an immiscible solvent, said core material having a core material dielectric constant and a core material dissipation factor;
providing a shell material having a shell material dielectric constant that is substantially different than said core material dielectric constant and having a shell material dissipation factor that is substantially different than said core material dissipation factor;
forming a precursor mixture comprising said core material and said shell material;
exposing said precursor mixture to a source of electromagnetic energy under conditions effective to microencapsulate said core material with said shell material.

104. The method of claim 103 wherein said shell material dielectric constant is substantially greater than said core material dielectric constant and said shell material dissipation factor is substantially greater than said core material dissipation factor.

105. The method of claim 103 wherein said shell material dielectric constant is a magnitude or more greater than said core material dielectric constant and said shell material dissipation factor is a magnitude greater than said core material dissipation factor.

106. The method of claim 103 wherein said exposing said precursor mixture to electromagnetic energy induces polymerization of the shell material.

107. The method of claim 104 wherein said exposing said precursor mixture to electromagnetic energy induces polymerization of the shell material.

108. The method of claim 105 wherein said exposing said precursor mixture to electromagnetic energy induces polymerization of the shell material.

109. The method of claim 103 wherein said immiscible solvent is hydrophilic.

110. The method of claim 104 wherein said immiscible solvent is hydrophilic.

111. The method of claim 105 wherein said immiscible solvent is hydrophilic.

112. The method of claim 106 wherein said immiscible solvent is hydrophilic.

113. The method of claim 107 wherein said immiscible solvent is hydrophilic.

114. The method of claim 108 wherein said immiscible solvent is hydrophilic.

115. The method of claim 103 wherein said immiscible solvent is selected from the group consisting of water, aqueous solutions, N-methyl pyrrolidone, acetone, methyl ethyl ketone, methyl isobutyl ketone, ethanol, propanol, and octanol.

116. The method of claim 108 wherein said immiscible solvent is selected from the group consisting of water, aqueous solutions, N-methyl pyrrolidone, acetone, methyl ethyl ketone, methyl isobutyl ketone, ethanol, propanol, and octanol.

117. The method of claim 103 wherein said shell material is miscible with said immiscible solvent.

118. The method of claim 104 wherein said shell material is miscible with said immiscible solvent.

119. The method of claim 105 wherein said shell material is miscible with said immiscible solvent.

120. The method of claim 108 wherein said shell material is miscible with said immiscible solvent.

121. The method of claim 114 wherein said shell material is miscible with said immiscible solvent.

122. The method of claim 103 wherein said shell material is a substantially monomeric material selected from the group consising of styrene oxide, acrylic acid, methacrylic acid, glycols, and acrylate monomers.

123. The method of claim 104 wherein said shell material is a substantially monomeric material selected from the group consising of styrene oxide, acrylic acid, methacrylic acid, glycols, and acrylate monomers.

124. The method of claim 105 wherein said shell material is a substantially monomeric material selected from the group consising of styrene oxide, acrylic acid, methacrylic acid, glycols, and acrylate monomers.

125. The method of claim 108 wherein said shell material is a substantially monomeric material selected from the group consising of styrene oxide, acrylic acid, methacrylic acid, glycols, and acrylate monomers.

126. The method of claim 114 wherein said shell material is a substantially monomeric material selected from the group consising of styrene oxide, acrylic acid, methacrylic acid, glycols, and acrylate monomers.

127. The method of claim 103 wherein said conditions comprise a polymerization catalyst.

128. The method of claim 104 wherein said conditions comprise a polymerization catalyst.

129. The method of claim 105 wherein said conditions comprise a polymerization catalyst.

130. The method of claim 108 wherein said conditions comprise a polymerization catalyst.

131. The method of claim 103 wherein said conditions comprise a hardening time of from about 10 seconds to about 500 seconds.

132. The method of claim 103 wherein said conditions comprise a hardening time of from about 20 seconds to about 100 seconds.

133. Microcapsules comprising a core material encapsulated by a shell material, said shell material comprising a shell material dielecteric constant and a shell material dissipation factor, said core material comprising a core material dielectric constant and a core material dissipation factor which are substantially different than said shell material dielectric constant and said shell material dissipation factor.

134. The microcapsules of claim 133 wherein said core material dielectric constant and said core material dissipation factor are at least a magnitude different than said shell material dielectric constant and said shell material dissipation factor.

135. The microcapsules of claim 133 wherein said shell material dielectric constant and said shell material dissipation factor are less than said core material dielectric constant and said core material dissipation factor.

136. The microcapsules of claim 134 wherein said shell material dielectric constant and said shell material dissipation factor are less than said core material dielectric constant and said core material dissipation factor.

137. The microcapsules of claim 133 wherein said shell material dielectric constant and said shell material dissipation factor are greater than said core material dielectric constant and said core material dissipation factor.

138. The microcapsules of claim 134 wherein said shell material dielectric constant and said shell material dissipation factor are greater than said core material dielectric constant and said core material dissipation factor.

139. The microcapsules of claim 133 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

140. The microcapsules of claim 134 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

141. The microcapsules of claim 135 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

142. The microcapsules of claim 136 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

143. The microcapsules of claim 137 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

144. The microcapsules of claim 138 wherein said core material is selected from the group consisting of alumina, acidulants, citric acid, ascorbic acid, antiperspirants, solid bleaches, coffee solids, fruits, nuts, leavening agents, oxidizers, pigments, sodium bicarbonate, sweeteners, salts, activated carbon, pesticides, fungicides, fumigants, seeds, antiperspirants, bleaches, deodorants, inks, active metals, catalysts, curing agents, chemoluminence agents, corrosion inhibitors, deodorants, flame retardants, organometallics, phase change materials, curing agents, sealants, and resins.

145. The microcapsules of claim 133 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

146. The microcapsules of claim 134 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

147. The microcapsules of claim 139 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

148. The microcapsules of claim 140 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

149. The microcapsules of claim 141 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

150. The microcapsules of claim 142 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

151. The microcapsules of claim 143 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

152. The microcapsules of claim 144 wherein said shell material is selected from the group consisting of paraffins, shellac, natural waxes, monoglycerides, diglycerides, triglycerides, lipids, fatty acids, and fatty alcohols, polyethylene oxide, polyethylene glycol, polyethylene, polypropylene, and polytetrafluoroethylene.

153. The microcapsules of claim 133 wherein said shell materials is a substantially monomeric material selected from the group consising of styrene oxide, acrylic acid, methacrylic acid, glycols, and acrylate monomers.

154. The microcapsules of claim 134 wherein said shell materials is a substantially monomeric material selected from the group consising of styrene oxide, acrylic acid, methacrylic acid, glycols, and acrylate monomers.

155. The microcapsules of claim 139 wherein said shell materials is a substantially monomeric material selected from the group consising of styrene oxide, acrylic acid, methacrylic acid, glycols, and acrylate monomers.

156. The microcapsules of claim 140 wherein said shell materials is a substantially monomeric material selected from the group consising of styrene oxide, acrylic acid, methacrylic acid, glycols, and acrylate monomers.

157. The microcapsules of claim 141 wherein said shell materials is a substantially monomeric material selected from the group consising of styrene oxide, acrylic acid, methacrylic acid, glycols, and acrylate monomers.

158. The microcapsules of claim 142 wherein said shell materials is a substantially monomeric material selected from the group consising of styrene oxide, acrylic acid, methacrylic acid, glycols, and acrylate monomers.

159. The microcapsules of claim 143 wherein said shell materials is a substantially monomeric material selected from the group consising of styrene oxide, acrylic acid, methacrylic acid, glycols, and acrylate monomers.

160. The microcapsules of claim 144 wherein said shell materials is a substantially monomeric material selected from the group consising of styrene oxide, acrylic acid, methacrylic acid, glycols, and acrylate monomers.

* * * * *